US011395271B2

(12) United States Patent
Diachina et al.

(10) Patent No.: US 11,395,271 B2
(45) Date of Patent: Jul. 19, 2022

(54) DUAL STRATEGY FOR SHORT PHYSICAL UPLINK CONTROL CHANNEL (SPUCCH) UTILIZATION

(71) Applicant: TELEFONAKTIEBOLAGET LM ERICSSON (PUBL), Stockholm (SE)

(72) Inventors: John Walter Diachina, Garner, NC (US); Laetitia Falconetti, Järfälla (SE); Robert Karlsson, Sundbyberg (SE); Cecilia Eklöf, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 302 days.

(21) Appl. No.: 16/637,084

(22) PCT Filed: Aug. 7, 2018

(86) PCT No.: PCT/IB2018/055928
§ 371 (c)(1),
(2) Date: Feb. 6, 2020

(87) PCT Pub. No.: WO2019/030662
PCT Pub. Date: Feb. 14, 2019

(65) Prior Publication Data
US 2020/0187196 A1 Jun. 11, 2020

Related U.S. Application Data

(60) Provisional application No. 62/542,192, filed on Aug. 7, 2017.

(51) Int. Cl.
*H04W 72/04* (2009.01)
*H04W 52/14* (2009.01)
(Continued)

(52) U.S. Cl.
CPC ...... *H04W 72/0413* (2013.01); *H04W 52/146* (2013.01); *H04W 52/365* (2013.01); *H04W 72/042* (2013.01); *H04W 72/1284* (2013.01)

(58) Field of Classification Search
CPC .......... H04W 72/0413; H04W 52/146; H04W 52/365; H04W 72/042; H04W 72/1284
See application file for complete search history.

(56) References Cited

U.S. PATENT DOCUMENTS

2017/0041103 A1   2/2017  Määttanen et al.
2018/0110042 A1*  4/2018  Chen ................. H04L 5/0055
(Continued)

FOREIGN PATENT DOCUMENTS

WO   2016175631 A1   11/2016

OTHER PUBLICATIONS

3GPP TS 36.212 V14.0.0 (Sep. 2016), 3rd Generation Partnership Project; Technical Specification Group Radio Access Network; Evolved Universal Terrestrial Radio Access (E-UTRA); Multiplexing and channel coding (Release 14), the whole document.
(Continued)

*Primary Examiner* — Michael K Phillips
(74) *Attorney, Agent, or Firm* — Christopher & Weisberg, P.A.

(57) ABSTRACT

A wireless device (e.g., UE) and a method implemented by the wireless device are described herein where the wireless device is configured with resources for both Physical Uplink Control Channel (PUCCH) and short PUCCH (sPUCCH), and determines whether or not the sPUCCH performance is equal to the PUCCH performance, and based on a result of the determination applies a strategy for determining when to trigger a fallback where the strategy is based on a number of failed Scheduling Request (SR) transmissions to a wireless access node (e.g., eNB, eNodeB, ng-eNB, gNB). A wireless
(Continued)

access node and method implemented by the wireless access node are also described herein.

20 Claims, 7 Drawing Sheets

(51) Int. Cl.
*H04W 52/36* (2009.01)
*H04W 72/12* (2009.01)

(56) References Cited

U.S. PATENT DOCUMENTS

| | | | |
|---|---|---|---|
| 2019/0246416 A1* | 8/2019 | Park | H04W 72/1278 |
| 2019/0281618 A1* | 9/2019 | Zhao | H04W 72/0413 |
| 2020/0059871 A1* | 2/2020 | Ryu | H04W 72/042 |
| 2020/0068600 A1* | 2/2020 | Yu | H04W 72/1278 |

OTHER PUBLICATIONS

3GPP TS 36.213 V14.1.0 (Dec. 2016), 3rd Generation Partnership Project; Technical Specification Group Radio Access Network; Evolved Universal Terrestrial Radio Access (E-UTRA); Physical layer procedures (Release 14), the whole document.

3GPP TS 36.321 V14.3.0 (Jun. 2017), 3rd Generation Partnership Project; Technical Specification Group Radio Access Network; Evolved Universal Terrestrial Radio Access (E-UTRA); Medium Access Control (MAC) protocol specification Release 14), the whole document.

3GPP TS 36.331 V14.3.0 (Jun. 2017), 3rd Generation Partnership Project; Technical Specification Group Radio Access Network; Evolved Universal Terrestrial Radio Access (E-UTRA); Radio Resource Control (RRC); Protocol specification Release 14), the whole document.

Ericsson, "SR and BSR operation with short TTIs", Tdoc R2-1704730, 3GPP TSG-RAN WG2 #98, Hangzhou, P.R. of China, May 15-19, 2017, p. 1, line 8-p. 8, line 15.

Catt, "sPUCCH design for sTTI", R1-1611354, 3GPP TSG RAN WG1 Meeting #87, Reno, USA Nov. 14-18, 2016, p. 1, line 8-p. 5, line 16.

Ericsson, "Revised Work Item on shortened TTI and processing time for LTE", RP-171468 (revision of RP-170113), 3GPP TSG RAN Meeting #76, West Palm Beach, USA, Jun. 5-8, 2017, the whole document.

* cited by examiner

DUAL STRATEGY FOR SHORT PHYSICAL UPLINK CONTROL CHANNEL (SPUCCH) UTILIZATION

CLAIM OF PRIORITY

This application is a national stage of International Application No. PCT/IB2018/055928, filed Aug. 7, 2018, which claims the benefit of priority to U.S. Provisional Patent Application No. 62/542,192, filed Aug. 7, 2017. The entire disclosure of each of these applications is fully incorporated herein by reference.

TECHNICAL FIELD

The present disclosure relates to a wireless device (and a method implemented thereby) that is configured with resources for both Physical Uplink Control Channel (PUCCH) and short PUCCH (sPUCCH), and determines whether or not the sPUCCH performance is equal to the performance of the PUCCH, and based on a result of this determination applies a strategy for determining when to trigger a fallback wherein the strategy is based on a number of failed Scheduling Request (SR) transmissions to a wireless access node. The present disclosure also relates to the wireless access node (and a method implemented thereby) that is configured to determine information associated with the serving cell of the wireless device, and transmit the information associated with the serving cell to the wireless device, wherein the information enables the wireless device to determine whether or not the sPUCCH performs equally well as the PUCCH.

BACKGROUND

The following abbreviations are herewith defined, at least some of which are referred to within the following description of the present disclosure.
3GPP 3rd-Generation Partnership Project
ASIC Application Specific Integrated Circuit
BLER Block Error Rate
BSS Base Station Subsystem
BTS Base Transceiver Station
CE Control Element
CN Core Network
CSI Channel State Information
DCI Downlink Control Information
DL Downlink
DMRS Demodulation Reference Symbols
DSP Digital Signal Processor
eNB Evolved Node B
EDGE Enhanced Data rates for GSM Evolution
EGPRS Enhanced General Packet Radio Service
E-UTRA Evolved Universal Terrestrial Radio Access
E-UTRAN Evolved Universal Terrestrial Radio Access Network
FDMA Frequency Division Multiple Access
gNB Next generation Node B
GSM Global System for Mobile Communication
HARQ Hybrid Automatic Repeat Request
HTTP Hypertext Transfer Protocol
LTE Long-Term Evolution
MAC Medium Access Control
MS Mobile Station
MTC Machine Type Communications
NB Node B
ng-eNB Next generation eNB
NR 5G New Radio
OFDM Orthogonal Frequency Division Multiplexing
PDCCH Physical Downlink Control Channel
PRACH Physical Random Access Channel
PDSCH Physical Downlink Shared Channel
PUCCH Physical Uplink Control Channel
PUSCH Physical Uplink Shared Channel
RAN Radio Access Network
RAT Radio Access Technology
RNC Radio Network Controller
RRC Radio Resource Control
SC Single Carrier
SF Subframe
S-GW Serving Gateway
SIBX SystemInformationBlock TypeX
SINR Signal to Interference and Noise Ratio
SNR Signal to Noise Ratio
SR Scheduling Request
SRS Sounding Reference Symbols
sPDCCH Short Physical Downlink Control Channel
sPDSCH Short Physical Downlink Shared Channel
sPUCCH Short Physical Uplink Control Channel
sPUSCH Short Physical Uplink Shared Channel
sTTI Short TTI
TCP Transmission Control Protocol
TTI Transmission Time Interval
UE User Equipment
UL Uplink
UTRAN Universal Terrestrial Radio Access Network
WCDMA Wideband Code Division Multiple Access
WiMAX Worldwide Interoperability for Microwave Access Packet data latency is one of the performance metrics that vendors, operators, and end-users regularly measure (e.g., via speed test applications). Packet data latency measurements are done in all phases of a lifetime of a radio access network (RAN) system, such as when verifying a new software release or a system component, when deploying the RAN system, and when the RAN system is in commercial operation.

Shorter packet data latency than previous generations of 3GPP radio access technologies (RATs) was one performance metric that guided the design of Long Term Evolution (LTE). The end-users also now recognize LTE to be a system that provides faster access to the internet and lower packet data latencies than previous generations of mobile radio technologies.

Packet data latency is important not only for the perceived responsiveness of the system but it is also a parameter that indirectly influences the throughput of the system. In this regard, Hypertext Transfer Protocol (HTTP)/Transmission Control Protocol (TCP) is the dominating application and transport layer protocol suite used on the internet today. According to the HTTP Archive the typical size of HTTP-based transactions over the internet are in the range of a few 10's of Kbytes up to 1 Mbyte. In this size range, the TCP slow start period is a significant part of the total transport period of the packet stream. During the TCP slow start the performance is packet data latency limited. Hence, improved packet data latency can rather easily be shown to improve the average throughput, for this type of TCP-based data transaction.

One approach to reduce the packet data latency is the reduction of transport time of data and control signalling, by addressing the length of a transmission time interval (TTI). By reducing the length of a TTI and maintaining the bandwidth (i.e., keeping the frequency domain resources constant), the processing time at the transmitter node and the receiver node is also expected to be reduced due to less data having to be processed within the reduced TTI. In LTE release 8, a TTI corresponds to one subframe (SF) of length 1 millisecond. One such 1 ms TTI is constructed by using 14 Orthogonal Frequency Division Multiplexing (OFDM) or 14 Single Carrier Frequency Division Multiple Access (SC-FDMA) symbols in the case of normal cyclic prefix and 12 OFDM or 12 SC-FDMA symbols in the case of extended cyclic prefix. In LTE release 14 in the 3rd-Generation Partnership Project (3GPP), a study item on packet data latency reduction has been conducted, with the goal of specifying transmissions with shorter TTIs, such as a slot or a few symbols. A work item with the goal of specifying short TTI (sTTI) started in August 2016 (see RP-171468, "Work Item on Shortened TTI and Processing Time for LTE", 3GPP TSG RAN Meeting #76, West Palm Beach, USA, Jun. 5-8, 2017—the entire contents of which are hereby incorporated herein by reference).

An sTTI can be realized using any duration in time, can comprise resources on any number of OFDM or SC-FDMA symbols, and can start at any fixed symbol position within the overall subframe. For the work in LTE, the focus of the work currently is to only allow the sTTIs to start at fixed positions with time durations of either 2, 3, or 7 symbols. Furthermore, the sTTI is not allowed to cross the slot or subframe boundaries.

One example of an sTTI configuration 100 is shown in a second row of FIG. 1 (PRIOR ART), where the duration of the uplink short TTI is 0.5 ms, i.e., seven SC-FDMA symbols 102 for the case with normal cyclic prefix. The third row of FIG. 1 (PRIOR ART) shows an sTTI configuration 110 with a combined length of 2 or 3 symbols 102 for each sTTI #0, sTTI #1, sTTI #2, sTTI #3, sTTI #4, and sTTI #5. The first row of FIG. 1 (PRIOR ART) shows a traditional TTI configuration 120 with 14 symbols 102. Here, the "R" in FIG. 1 (PRIOR ART) indicates the Demodulation Reference Symbols (DMRS) symbols 102, and the "D" indicates the data symbols 102. Other sTTI configurations are not excluded, and FIG. 1 (PRIOR ART) is only an attempt to illustrate differences in possible sTTI lengths.

Although the use of a sTTI has merits when it comes to reducing packet data latency, it can also have a specifically negative impact to the uplink (UL) coverage since less energy is transmitted by the User Equipment (UE) (i.e., a reduced number of resource elements are transmitted when sTTI is used). For example, when considering the UL control channel, the same Hybrid Automatic Repeat Request (HARQ) information and Channel State Information (CSI) as well as Scheduling Requests which are sent when the legacy TTI is used still need to be sent when the sTTI is used but will be transmitted using less energy.

Due to the potential for reduced UL control channel performance when a UE transmits using sTTI, one possible solution is to configure a longer sTTI length on the UL than for the downlink (DL) to combat these problems. For example, the configured sTTI length combination in the [DL,UL] can consist of {2,7}. In another possible solution, there is also the possibility of the network scheduling the UE with a 1 ms TTI duration (as per the first row of FIG. 1) dynamically on a subframe-by-subframe basis in support of the most demanding coverage conditions.

The following terms are used in the discussion hereinafter:

Physical Uplink Control Channel (PUCCH) denotes the UL control channel on 1 ms TTI while short PUCCH (sPUCCH) denotes the UL control channel on a sTTI.

Physical Uplink Shared Channel (PUSCH) denotes the UL data channel on 1 ms TTI while short PUSCH (sPUSCH) denotes the UL data channel on a sTTI.

Physical Downlink Control Channel (PDCCH) denotes the DL control channel on 1 ms TTI while short PDCCH (sPDCCH) denotes the DL control channel on a sTTI.

Physical Downlink Shared Channel (PDSCH) denotes the DL data channel on 1 ms TTI while short PDSCH (sPDSCH) denotes the DL data channel on a sTTI.

In LTE, the UL control channel PUCCH can be used to carry different types of information: HARQ feedback, scheduling request (SR), and CSI feedback. Different PUCCH formats with different maximum payloads are defined to be able to carry the different information types. For example, PUCCH format 1/1a/1b is suitable for transmitting very low payload of UL control information like HARQ feedback and scheduling request (SR). While, PUCCH format 2/3/4/5 is suitable for larger payload of UL control information, like more than 2 HARQ bits and CSI report. Similarly, different formats with different maximum payloads will be supported for sPUCCH.

Before transmitting the PUCCH, the UE should compute the required transmit power according to the power control equation for PUCCH defined in the 3GPP Technical Specification (TS) 36.213 v14.3.0, June 2017 entitled "3rd Generation Partnership Project; Technical Specification Group Radio Access Network; Evolved Universal Terrestrial Radio Access (E-UTRA); Physical layer procedures" (the entire contents of which are hereby incorporated herein by reference) as follows.

For subframe i and serving cell c, $$P_{PUCCH}(i) = \min \begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix}$$

for PUCCH format 1/1a/1b/2/2a/2b/3, and $$P_{PUCCH}(i) = \min \begin{Bmatrix} P_{CMAX,c}(i), \\ P_{0\_PUCCH} + PL_c + 10\log_{10}(M_{PUCCH,c}(i)) + \Delta_{TF,c}(i) + \Delta_{F\_PUCCH}(F) + g(i) \end{Bmatrix}$$

for PUCCH format 4/5, where $P_{CMAX,c}(i)$ is the maximum transmit power.

$P_{O\_PUCCH}$ is the target of received power.

$PL_c$ is the downlink path loss estimate.

$h(n_{CQI}, n_{HARQ}, n_{SR})$ is a PUCCH format dependent value that reflects cases with larger payload.

$M_{PUCCH,c}(i)$ is the number of resource blocks for PUCCH format 5, equals 1 for all other formats.

$\Delta_{F\_PUCCH}(F)$ is a relation in dB between PUCCH format F and PUCCH format 1a.

$\Delta_{TF,c}(i)$ is an adjustment factor depending on number of coded bits that is exactly specified in 3GPP TS 36.213.

$\Delta_{TxD}(F')$ depends on the number of antenna ports configured for PUCCH.

g(i) is the closed loop power control state and is updated using $\delta_{PUCCH}$ signaled in the downlink assignment.

It is to be noted that a similar procedure and power control equation will be defined for sPUCCH A UE that has uplink data in its buffer indicates it wants to be scheduled on the UL by sending the network a "Scheduling Request", SR. In LTE, the SR can be indicated using any of the PUCCH formats. But, if a UE has no other UL control information to send other than the SR, then the PUCCH format selected for the SR transmission is PUCCH format 1, which is defined so that multiple UEs can transmit SRs simultaneously (i.e., using the same time and frequency domain resources). As such, multiple UEs can transmit SRs simultaneously to indicate to the network that they want to be scheduled for uplink data transmission. The periodicity with which the UE can transmit an SR to the network is configurable. A SR sent using PUCCH is transmitted using 14 SC-FDMA symbols for the case with normal cyclic prefix as per row 1 of FIG. 1 (i.e., a TTI of 1 ms).

The concept of sending a SR using a sPUCCH has been recently introduced wherein a sTTI (e.g., as per the second and third rows of FIG. 1) is used by the UE to convey the SR to the network, thereby allowing the UE to reduce the time required to inform the network that it wants to be scheduled for uplink data transmission. A UE can be configured with both PUCCH and sPUCCH as separate resources allowing the potential for even further reducing the packet data delay experienced. For example, the location of the periodic transmission opportunities provided by PUCCH and sPUCCH can be staggered in the time domain, thereby allowing a UE to select the next available PUCCH or sPUCCH for SR transmission whenever the UE determines it has uplink data in its buffer.

A UE configured with both PUCCH and sPUCCH needs a process for determining how it should use PUCCH and sPUCCH when transmitting the SR to inform the network that it has uplink data in its buffer. The decision process can take into account the reality that sPUCCH coverage is worse than PUCCH coverage. Possible examples of UE implementations when the UE is configured with only the PUCCH (legacy operation) and when the UE is configured with both PUCCH and sPUCCH (implementations 1 and 2) are as follows:

Legacy Operation:

As per legacy operation, a UE configured with only PUCCH transmits the SR thereon up to K times without success (i.e., a valid grant is not received) before it triggers fallback (i.e., at fallback, the UE releases its PUCCH resources and resorts to contention-based access on the Physical Random Access Channel (PRACH)).

Implementation 1:

A UE configured with PUCCH and sPUCCH transmits on the first available SR resource up to M times before fallback but must still transmit SR on the PUCCH K times (without success) before fallback is allowed (i.e., at fallback, the UE releases its PUCCH and sPUCCH resources and resorts to contention-based access on the Physical Random Access Channel (PRACH)). This implementation requires that M is larger than K to ensure that the probability of successful SR transmission is not affected by poor sPUCCH coverage (e.g., the UE experiences a downlink coverage that is less than 9 dB above the maximum coupling loss allowed for its serving cell). However, if sPUCCH coverage is sufficiently robust (e.g., the UE experiences a downlink coverage that is 9 dB or more above the maximum coupling loss allowed for its serving cell) then the performance of the sPUCCH can be considered as being equal to that of the PUCCH. As such, when sPUCCH and PUCCH provide equal performance, a UE will effectively make up to M equally robust SR transmissions (where M is larger than K) and thereby experience excessive battery consumption before triggering a fallback when compared to the legacy operation.

Implementation 2:

A UE configured with PUCCH and sPUCCH accommodates the possibility of poor sPUCCH coverage by first sending the SR up to K times without success on the sPUCCH only, and if still no valid grant is received, it sends the SR on PUCCH up to N more times without success at which point it triggers fallback (i.e., at fallback, the UE releases its PUCCH and sPUCCH resources and resorts to contention-based access on the Physical Random Access Channel (PRACH)). As with the "Implementation 1" above, if the sPUCCH coverage actually experienced by the UE is sufficiently robust then the performance of the sPUCCH can be considered as being equal to that of the PUCCH. As such, when sPUCCH and PUCCH provide equal performance, a UE will then effectively make up to K+N equally robust SR transmissions and once again experience excessive battery consumption before triggering a fallback when compared to the legacy operation.

Considering these two possible implementation examples, it can be seen that there is a need for a more optimized UE strategy for determining when to trigger a fallback that should take into account whether or not the performance of the sPUCCH can be considered as being equal to that of the PUCCH. This need and other needs are addressed by the present disclosure.

SUMMARY

A wireless device (e.g., UE), a wireless access node (e.g., eNB, eNodeB, ng-eNB, gNB), and various methods for addressing the aforementioned need in the prior art are described in the independent claims. Advantageous embodiments of the wireless device, the wireless access node, and various methods are further described in the dependent claims.

In one aspect, the present disclosure provides a wireless device configured to interact with a wireless access node. The wireless device comprises a transceiver circuit configured with resources for a PUCCH and a sPUCCH, and further comprises a buffer that has uplink data stored therein. In addition, the wireless device comprises a processor and a memory that stores processor-executable instructions, wherein the processor interfaces with the memory to execute the processor-executable instructions, whereby the wireless device is operable to perform a determine operation and an apply operation. In the determine operation, the wireless device determines whether or not the sPUCCH performs equally well as the PUCCH. In the apply operation, based on the determination of whether or not the sPUCCH performs equally well as the PUCCH, the wireless device applies a strategy for determining when to trigger a fallback, wherein the strategy is based on a number of failed SR transmissions to the wireless access node, wherein the SR transmissions are transmitted by the transceiver circuit to the wireless access node due to the buffer having uplink data stored therein, and wherein the fallback if triggered includes releasing the resources for the PUCCH and the sPUCCH. An advantage of this specially configured wireless device is that it will experience improved battery conservation and an improved overall packet delay performance for the pending uplink data transmission whenever the wireless device determines that fallback is necessary.

In another aspect, the present disclosure provides a method implemented by a wireless device configured to interact with a wireless access node. The wireless device comprises a transceiver circuit configured with resources for a PUCCH and a sPUCCH, and further comprises a buffer that has uplink data stored therein. The method comprises a determining step and an applying step. In the determining step, the wireless device determines whether or not the sPUCCH performs equally well as the PUCCH. In the applying step, based on the determination of whether or not the sPUCCH performs equally well as the PUCCH, the wireless device applies a strategy for determining when to trigger a fallback, wherein the strategy is based on a number of failed SR transmissions to the wireless access node, wherein the SR transmissions are transmitted by the transceiver circuit to the wireless access node due to the buffer having uplink data stored therein, and wherein the fallback if triggered includes releasing the resources for the PUCCH and the sPUCCH. An advantage of the wireless device implementing this method is that the wireless device will experience improved battery conservation and an improved overall packet delay performance for the pending uplink data transmission whenever the wireless device determines that fallback is necessary.

In yet another aspect, the present disclosure provides a wireless access node configured to interact with a wireless device, wherein the wireless device is located in a serving cell, and wherein the wireless device is configured with resources for a PUCCH and a sPUCCH, The wireless access node comprises a processor and a memory that stores processor-executable instructions, wherein the processor interfaces with the memory to execute the processor-executable instructions, whereby the wireless access node is operable to perform a determine operation and a transmit operation. In the determine operation, the wireless access node determines information associated with the serving cell. In the transmit operation, the wireless access node transmits, to the wireless device, the information associated with the serving cell, wherein the information enables the wireless device to determine whether or not the sPUCCH performs equally well as the PUCCH. An advantage of this specially configured wireless access node is that the wireless device by utilizing this information will experience improved battery conservation and an improved overall packet delay performance for uplink data transmission whenever the wireless device determines that fallback is necessary.

In yet another aspect, the present disclosure provides a method implemented by a wireless access node configured to interact with a wireless device, wherein the wireless device is located in a serving cell, and wherein the wireless device is configured with resources for a PUCCH and a sPUCCH, The method comprises a determining step and a transmitting step. In the determining step, the wireless access node determines information associated with the serving cell. In the transmitting step, the wireless access node transmits, to the wireless device, the information associated with the serving cell, wherein the information enables the wireless device to determine whether or not the sPUCCH performs equally well as the PUCCH. An advantage of the wireless access node implementing this method is that the wireless device by utilizing this information will experience improved battery conservation and an improved overall packet delay performance for uplink data transmission whenever the wireless device determines that fallback is necessary.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

Figure 1:
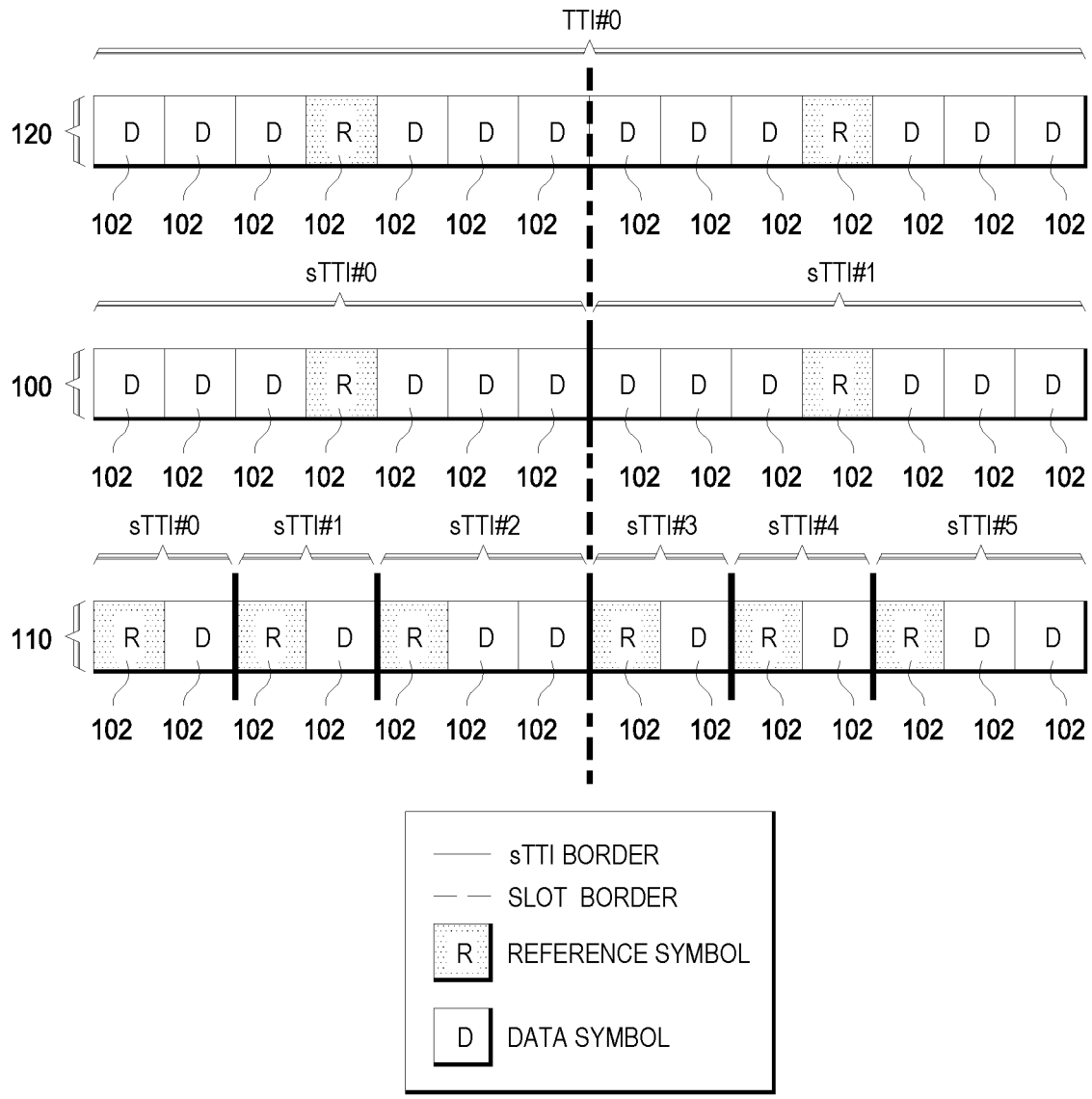
FIG. 1 (PRIOR ART) illustrates an exemplary TTI configuration and exemplary sTTI configurations within an uplink subframe.
Figure 2:
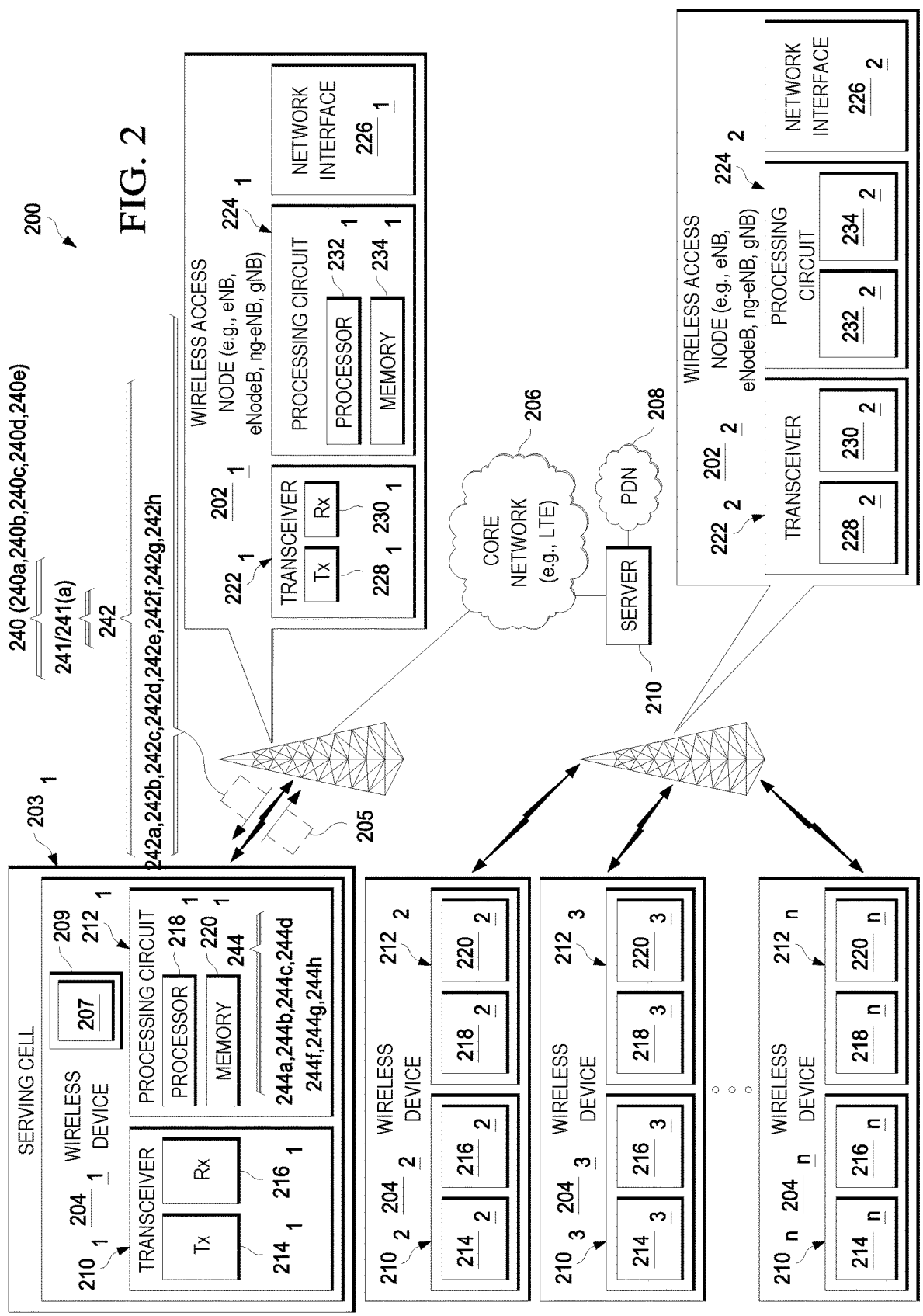
FIG. 2 is a diagram of an exemplary wireless communication network which includes multiple wireless access nodes (e.g., eNBs, eNodeBs, ng-eNBs, gNBs) and multiple wireless devices (e.g., UEs) configured in accordance with an embodiment of the present disclosure.

A discussion is provided first herein to describe an exemplary wireless communication network that includes multiple wireless access nodes (e.g., eNBs, eNodeBs, ng-eNBs, gNBs), and multiple wireless devices (e.g., UEs) which are configured in accordance with different embodiments of the present disclosure (see FIG. 2). Then, a discussion is provided herein to describe how the wireless device (e.g., UE) and the wireless access node (e.g., eNB, eNodeB, ng-eNB, gNB) can address the aforementioned need associated with the prior art in accordance with different embodiments of the present disclosure (see FIG. 2). Thereafter, a discussion is provided to explain the basic functionalities-configurations of the wireless device (e.g., UE) and the wireless access node (e.g., eNB, eNodeB, ng-eNB, gNB) in accordance with different embodiments of the present disclosure (see FIGS. 3-14).

Exemplary Wireless Communication Network 200

Referring to FIG. 2, there is illustrated an exemplary wireless communication network 200 in accordance with the present disclosure. The wireless communication network 200 includes a core network 206 (e.g., LTE network 206) and multiple wireless access nodes $202_1$ and $202_2$ (only two shown) which interface with multiple wireless devices $204_1$, $204_2$, $204_3$ ... $204_n$. The wireless communication network 200 also includes many well-known components, but for clarity, only the components needed to describe the features of the present disclosure are described herein. Further, the wireless communication network 200 is described herein as being an LTE wireless communication network 200. However, those skilled in the art will readily appreciate that the techniques of the present disclosure which are applied to the LTE wireless communication network 200 are generally applicable to other types of wireless communication systems, including, for example, NR, WCDMA, WiMAX, GSM/EGPRS systems. A GSM/EGPRS network is also known as a GSM/EDGE network.

The wireless communication network 200 includes a plurality of wireless access nodes $202_1$ and $202_2$ (only two shown) which provide network access to the wireless devices $204_1$, $204_2$, $204_3$ ... $204_n$. In this example, the wireless access node $202_1$ (e.g., eNB, eNodeB, ng-eNB, gNB $202_1$) is providing network access to wireless device $204_1$ (which is located in a serving cell $203_1$) while the RAN node $202_2$ (e.g., eNB, eNodeB, ng-eNB, gNB $202_2$) is providing network access to wireless devices $204_2$, $204_3$ ... $204_n$. The wireless access nodes $202_1$ and $202_2$ are connected to the core network 206. The core network 206 is connected to an external packet data network (PDN) 208, such as the Internet, and a server 210 (only one shown). The wireless devices $204_1$, $204_2$, $204_3$ ... $204_n$ may transmit SR 205 to one or more wireless access nodes $202_1$ and $202_2$ (e.g., wireless device $204_1$ is shown transmitting SR 205 to wireless access node $202_1$). The wireless devices $204_1$, $204_2$, $204_3$ ... $204_n$ may communicate with one or more servers 210 (only one shown) connected to the core network 206 and/or the PDN 208.

The wireless devices $204_1$, $204_2$, $204_3$ ... $204_n$ may refer generally to an end terminal that attaches to the wireless communication network 200, and may refer to either a MTC device (e.g., a smart meter) or a non-MTC device. Further, the term "wireless device" is generally intended to be synonymous with the term mobile device, mobile station (MS), "User Equipment," or UE, as that term is used by 3GPP, and includes standalone wireless devices, such as terminals, cell phones, smart phones, and wireless-equipped personal digital assistants, as well as wireless cards or modules that are designed for attachment to or insertion into another electronic device, such as a personal computer, electrical meter, etc. The wireless devices $204_1$, $204_2$, $204_3$ ... $204_n$ may have a buffer 209 for uplink data 207.

Likewise, unless the context clearly indicates otherwise, the term wireless access node $202_1$ and $202_2$ is used herein in the most general sense to refer to a base station or a wireless access point in a wireless communication network, and may refer to wireless access nodes $202_1$ and $202_2$ that are controlled by a physically distinct radio network controller as well as to more autonomous access points, such as the so-called evolved Node Bs (eNodeBs) in Long-Term Evolution (LTE) networks. Accordingly, the term "wireless access node" may also refer to Radio Network Controllers (RNCs) and Node Bs (NBs) in 3G, or Base Station Controllers (BSCs) or Base Transceiver Stations (BTSs) in 2G.

Each wireless device $204_1$, $204_2$, $204_3$ ... $204_n$ may include a transceiver circuit $210_1$, $210_2$, $210_3$ ... $210_n$ for communicating with the wireless access nodes $202_1$ and $202_2$, and a processing circuit $212_1$, $212_2$, $212_3$ ... $212_n$ for processing signals transmitted from and received by the transceiver circuit $210_1$, $210_2$, $210_3$ ... $210_n$ and for controlling the operation of the corresponding wireless device $204_1$, $204_2$, $204_3$ ... $204_n$. The transceiver circuit $210_1$, $210_2$, $210_3$ ... $210_n$ may include a transmitter $214_1$, $214_2$, $214_3$ ... $214_n$ and a receiver $216_1$, $216_2$, $216_3$ ... $216_n$, which may operate according to any standard, e.g., the LTE standard. The processing circuit $212_1$, $212_2$, $212_3$ ... $212_n$ may include a processor $218_1$, $218_2$, $218_3$ ... $218_n$ and a memory $220_1$, $220_2$, $220_3$ ... $220_n$ for storing program code for controlling the operation of the corresponding wireless device $204_1$, $204_2$, $204_3$ ... $204_n$. The program code may include code for performing the procedures as described hereinafter.

Each wireless access node $202_1$ and $202_2$ may include a transceiver circuit $222_1$ and $222_2$ for communicating with the wireless devices $204_1$, $204_2$, $204_3$ ... $204_n$, a processing circuit $224_1$ and $224_2$ for processing signals transmitted from and received by the transceiver circuit $222_1$ and $222_2$ and for controlling the operation of the corresponding wireless access node $202_1$ and $202_2$, and a network interface $226_1$ and $226_2$ for communicating with the core network 206 (via core network nodes such as Serving GPRS Support Nodes (SGSNs) in GPRS or Mobility Management Entities (MMEs) in LTE or Serving Gateways (S-GWs) in LTE). The transceiver circuit $222_1$ and $222_2$ may include a transmitter $228_1$ and $228_2$ and a receiver $230_1$ and $230_2$, which may operate according to any standard, e.g., the LTE standard. The processing circuit $224_1$ and $224_2$ may include a processor $232_1$ and $232_2$, and a memory $234_1$ and $234_2$ for storing program code for controlling the operation of the corresponding wireless access node $202_1$ and $202_2$. The program code may include code for performing the procedures as described hereinafter.

Optimized UE Strategies for Determining when to Trigger a Fallback

The present disclosure addresses the need of the prior art as described above in the Background Section. More specifically, the present disclosure addresses the need of the prior art by enabling a wireless device $204_1$ (for example) that is configured with resources for both the Physical Uplink Control Channel (PUCCH) and the short PUCCH (sPUCCH) to determine whether or not the sPUCCH performance is equal to the performance of the PUCCH, and based on a result of this determination apply a strategy for determining when to trigger a fallback where the strategy is based on a number of failed SR transmissions to the wireless access node $202_1$ (for example). A detailed discussion is provided below to describe several different ways that the wireless device $204_1$ (for example) and the wireless access node $202_1$ (for example) can address the need of the prior art.

The present disclosure is premised on the case wherein the wireless device $204_1$ (e.g., UE $204_1$) is configured with PUCCH and sPUCCH resources. Further, the present disclosure describes several different ways (e.g., eight embodiments) the wireless device $204_1$ is configured to determine whether or not the sPUCCH performance is equal to the performance of the PUCCH, and based on a result of this determination apply a strategy for determining when to trigger a fallback, where the strategy is based on a number of failed SR transmissions 205 to the wireless access node $202_1$ (i.e., at fallback, the wireless device $204_1$ releases its PUCCH and sPUCCH resources and resorts to a contention-based access on the Physical Random Access Channel (PRACH)). These different ways (e.g., eight embodiments) are as follows:

In the first embodiment, the wireless device $204_1$ (e.g., UE $204_1$) is configured with both PUCCH and sPUCCH resources and receives information 240 associated with its serving cell $203_1$ from the wireless access node $202_1$ (the wireless access node $202_1$ (e.g., an eNB $202_1$) may manage the transmission of cell specific information for a multitude of cells where one of which is used by the wireless device $204_1$ (e.g., UE $204_1$) as its serving cell $203_1$). In this embodiment, the information 240 provides a parameter 241 that identifies a "performance" threshold 242 that is compared to the "performance" 244 of the serving cell $203_1$ as measured by the wireless device $204_1$. The measured "performance" 244 of the serving cell $203_1$ must meet or exceed the "performance" threshold 242 provided by the parameter 241 in order for the wireless device $204_1$ to consider the sPUCCH performance as being equal to the performance of the PUCCH.

In one example, the information 240 received from the wireless access node $202_1$ is part of system information 240a associated with the serving cell $203_1$ (e.g., sent as part of SIBX). In another example, the information 240 received from the wireless access node $202_1$ is part of a higher layer configuration procedure 240b, e.g., a Radio Resource Control (RRC) configuration. In yet another example, the information 240 received from the wireless access node $202_1$ is part of a downlink control information (DCI) 240c sent on a downlink control channel. In still yet another example, the information 240 received from the wireless access node $202_1$ is part of Medium Access Control (MAC) Control Element (CE) 240d.

In one example, the parameter 241 associated with the serving cell $203_1$ and provided by the wireless access node $202_1$ refers to a downlink coverage level 242a of the DL control channel (e.g., PDCCH or sPDCCH). The downlink coverage level 242a can have a value which can be, for instance, a block error rate (BLER) threshold 242b or a signal quality threshold such as a Signal to Noise Ratio (SNR) threshold 242c or a Signal to Interference and Noise Ratio (SINR) threshold 242d for the DL control channel. For example, if a measured BLER 244b of the PDCCH is at or below the provided (BLER) threshold 242b (i.e., the measured PDCCH BLER 244b is better than the BLER threshold 242b), the sPUCCH performance can be considered as equal to the PUCCH performance. As another example, if a measured SNR 244c is larger than or equal to the provided (SNR) threshold 242c (i.e., the measured PDCCH SNR 244c is better than the SNR threshold 242c), the sPUCCH performance can be considered as equal to the PUCCH performance. It should be appreciated that for this method the wireless device $204_1$ (for example) assumes there is a significant correlation between downlink and uplink radio channel performance and therefore upon determining that the measured SNR 244c of the DL control channel (PDCCH) equals or exceeds the corresponding provided SNR threshold 242c during a certain limited time window prior to the next occurrence of its sPUCCH, the mobile station $204_1$ concludes that the sPUCCH performance is equal to the PUCCH performance. As another example, if a measured SINR 244d is larger than or equal to the provided (SINR) threshold 242d (i.e., the measured PDCCH SINR 244d is better than the SINR threshold 242d), the sPUCCH performance can be considered as equal to the PUCCH performance. Further, for this method the wireless device $204_1$ (for example) assumes there is a significant correlation between downlink and uplink radio channel performance and therefore, upon determining that the measured SINR 244d of the DL control channel (PDCCH) equals or exceeds the corresponding provided SINR threshold 242d during a certain limited time window prior to the next occurrence of its sPUCCH, the mobile station $204_1$ concludes that the sPUCCH performance is equal to the PUCCH performance. In yet another example, the downlink coverage level 242a can apply to the DL data channel. For this method the wireless device $204_1$ (for example) can attempt to evaluate the measured BLER 244b, SNR 244c, or SINR 244d applicable to the DL data channel if data block transmissions (e.g., MAC Protocol Data Units) are received thereon within a certain limited time window prior to the next occurrence of its sPUCCH. Once again, a significant correlation between downlink and uplink radio channel performance is assumed. Therefore, upon determining that (i) the measured BLER 244b of the DL data channel (PDSCH or sPDSCH) is at or below the corresponding provided BLER threshold 242b, (ii) the measured SNR 244c of the DL data channel (PDSCH or sPDSCH) exceeds or equals the corresponding provided SNR threshold 242c, or (iii) the measured SINR 244d of the DL data channel (PDSCH or sPDSCH) exceeds or equals the corresponding provided SINR threshold 242d, where the thresholds could apply to a DL data channel, the mobile station $204_1$ concludes that the sPUCCH performance is equal to the PUCCH performance.

In a second embodiment, the parameter 241 provided by the wireless access node $202_1$ and associated with the serving cell $203_1$ refers to an uplink coverage level 242e of an UL control channel (e.g., PUCCH or sPUCCH). The uplink coverage level 242e can be for instance a UL transmit power threshold 242f. The wireless device $204_1$ (e.g., UE $204_1$), before transmitting in UL, computes the required transmit power 244f according to a specified power control equation. For example, if the computed required transmit power 244f for sPUCCH transmission is below the UL transmit power threshold 242f provided by the wireless access node $202_1$, then the sPUCCH performance can be considered as equal to the PUCCH performance.

In a third embodiment, the parameter 241 provided by the wireless access node $202_1$ and associated with the serving cell $203_1$ refers to a coverage level difference 242g of two physical channels. For instance, the coverage level difference 242g can be a threshold parameter indicating the maximum allowed difference in transmit power required for PUCCH and the transmit power required for sPUCCH. If the computed transmit power difference $244g$ is lower than the provided coverage level difference $242g$, the sPUCCH performance can be considered as equal to the PUCCH performance. It is to be noted that when applying the coverage level difference $242g$ of the third embodiment, it is assumed that the transmit power levels the wireless device $204_1$ (for example) determines to be required for the PUCCH and the sPUCCH are each less than the maximum transmit power of which the wireless device $204_1$ is capable.

In a fourth embodiment, the parameter 241 provided by the wireless access node $202_1$ and associated with the serving cell $203_1$ refers to the power headroom $242h$ that is compared to a computed and reported power headroom $244h$ in MAC. For example, if the power headroom $244h$ computed and reported by the wireless device $204_1$ (e.g., UE $204_1$) meets or exceeds the power headroom $242h$ indicated by the parameter 241 for the serving cell $203_1$, then the sPUCCH performance can be considered as equal to the PUCCH performance. It is to be noted that the power headroom $242h$ represents a value below the maximum transmit power of which the wireless device $204_1$ (for example) is capable.

In a fifth embodiment, the wireless device $204_1$ (e.g., UE $204_1$) is configured with both PUCCH and sPUCCH resources and receives information $240e$ from the wireless access node $202_1$ and associated with the serving cell $203_1$ that indicates whether the sPUCCH performance can be considered as being equal to the performance of the PUCCH or not. This information $240e$ can be part of higher layer signalling (e.g., RRC configuration), physical layer signalling (e.g., DCI), or MAC CE.

In a sixth embodiment, the wireless device $204_1$ (e.g., UE $204_1$), upon determining that the sPUCCH performance is equal to the performance of the PUCCH, applies a first strategy for determining when to trigger a fallback (i.e., when fallback is triggered the wireless device $204_1$ releases its PUCCH and sPUCCH resources), wherein the fallback will be triggered when there is a total of X1 failed SR transmissions 205 on any combination of PUCCH or sPUCCH (e.g., the maximum failed SR transmissions 205, X1, can be sent as part of SIBX or RRC configured in dedicated signalling).

In a seventh embodiment, the wireless device $204_1$ (e.g., UE $204_1$), upon determining that the sPUCCH performance is not equal to the performance of the PUCCH, applies a second strategy for determining when to trigger fallback (i.e., when fallback is triggered the wireless device $204_1$ releases its PUCCH and sPUCCH resources), wherein the fallback will be triggered when there is a total of X2 failed SR transmissions 205 on any combination of PUCCH or sPUCCH (e.g., the maximum failed SR transmissions 205, X2, can be sent as part of SIBX or RRC configured in dedicated signalling) and at least Y1 of the X2 SR transmissions 205 are sent on PUCCH. The value of Y1 can be optionally included as part of the system information $240a$ (e.g., sent as part of SIBX or RRC configured in dedicated signalling) received by the wireless device $204_1$, and if excluded from the system information $240a$, the value of Y1 can default to the value of K where K is the legacy value used for the maximum number of SR transmissions 205 that can be made on the PUCCH without success (at which point fallback is triggered).

In an eighth embodiment, the wireless device $204_1$ (e.g., UE $204_1$) applies a third strategy for determining whether to send the SR transmissions 205 on the sPUCCH (if the sPUCCH performance is equal to the performance of the PUCCH) or to send the SR transmissions 205 on the PUCCH (if the sPUCCH performance is not equal to the performance of the PUCCH). If the wireless device $204_1$ (e.g., UE $204_1$) determines to send the SR transmissions 205 on the sPUCCH (i.e., when the sPUCCH performance is equal to the performance of the PUCCH), the wireless device $204_1$ (e.g., UE $204_1$) may possibly send the SR transmissions 205 also on the PUCCH after a total of X3 failed SR transmissions on the sPUCCH (e.g., the maximum failed SR transmissions 205, X3, can be sent as part of SIBX or RRC configured in dedicated signalling). In this case, a total of X3 failed SR transmissions 205 on sPUCCH and possibly thereafter Y3 SR transmissions 205 on PUCCH will trigger a fallback. The values of X3 and Y3 may be sent in SIBX, be RRC configured, or may apply a default value. The value of Y3 may be the legacy value used for the maximum number of SR transmissions.

The following is an exemplary scenario in accordance with the present disclosure where the wireless device $204_1$ (e.g., UE $204_1$) is configured with PUCCH and sPUCCH resources, wherein the wireless device $204_1$ receives system information $240a$ in its serving cell $203_1$ (e.g., sent as part of SystemInformationBlockTypeX (SIBX)) which provides a sPUCCHthresh parameter $241a$ (the sPUCCHthresh parameter $241a$ refers to a threshold applicable to the DL control channel or to the DL data channel) that identifies the downlink coverage level $242a$ of the PDCCH which, if met or exceeded, by the downlink coverage level $244a$ measured by the wireless device $204_1$ results in the wireless device considering the sPUCCH performance as being equal to the performance of the PUCCH (see first embodiment). With these assumptions a more optimized wireless device $204_1$ implementation can be realized as follows:

If the measured downlink coverage level $244a$ of the PDCCH in the serving cell $203_1$ meets or exceeds the downlink coverage level $242a$ indicated by sPUCCHthresh parameter $241a$, then the wireless device $204_1$ considers the PUCCH and sPUCCH as equally reliable resources and therefore uses strategy 1 for determining when to trigger fallback (see sixth embodiment). For strategy 1, a total of X1 failed SR transmissions 205 on any combination of PUCCH or sPUCCH will trigger fallback. If a fallback becomes necessary within the context of strategy 1, then the delay already experienced by the wireless device $204_1$ at the point of triggering the fallback can be less than the delay experienced by a wireless device only configured with PUCCH, thereby improving overall delay performance for the pending uplink data transmission even when fallback is necessary.

If the measured downlink coverage level $244a$ of the serving cell $203_1$ is less than the downlink coverage level $242a$ indicated by sPUCCHthresh parameter $241a$, then the wireless device $204_1$ considers the PUCCH and sPUCCH as unequally reliable resources and therefore uses strategy 2 for determining when to trigger fallback (see the seventh embodiment). For strategy 2, a total of X2 failed SR transmissions 205 on any combination of PUCCH or sPUCCH where at least Y1 of the X2 SR transmissions are sent on PUCCH will trigger fallback. As an example, strategy 2 can comprise implementation 1 above where X2=M and Y1=K. The value of Y1 can be optionally included as part of system information $240a$ (e.g., in SIBX), and if excluded from system information $240a$, the value of Y1 can default to K where K is the legacy value used for the maximum number of SR transmissions 205 that can be made on the PUCCH without success (at which point fallback is triggered).

If the measured downlink coverage level 244a of the serving cell $203_1$ meets or exceeds the downlink coverage level 242a indicated by sPUCCHthresh parameter 241a, then the wireless device $204_1$ uses strategy 3 and only sends the SRs on the sPUCCH up to a certain number of times X3, after which the wireless device $204_1$ will switch to only using the PUCCH (see the eighth embodiment). If the measured downlink coverage level 244a of the serving cell $203_1$ is less than the downlink coverage level 242a indicated by sPUCCHthresh parameter 241a, then the wireless device $204_1$ uses strategy 3 and only sends the SRs 205 on the PUCCH (see the eighth embodiment).

In the above embodiments, it should be noted that the wireless device $204_1$ will initiate the technical features of the present disclosure because the wireless device $204_1$ has uplink data 207 in its buffer 209 which indicates that the wireless device $204_1$ wants to be scheduled on the UL and as such will transmit the SRs 205 to the wireless access node $202_1$.

Basic Functionalities-Configurations of Wireless Device $204_1$ (for Example), and Wireless Access Node $202_1$ (for Example)

Figure 3:
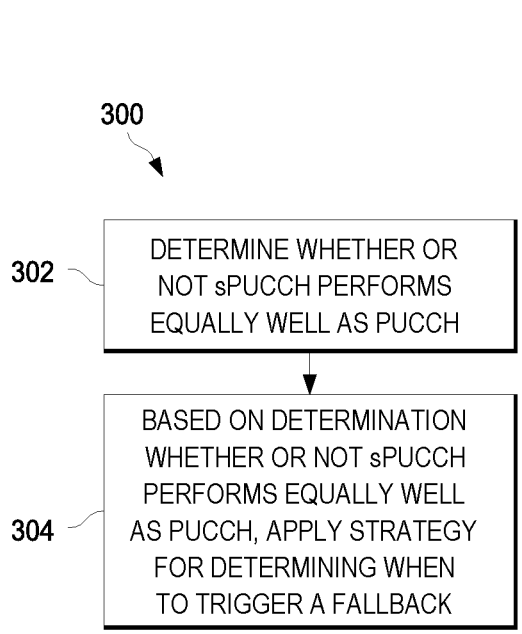
FIG. 3 is a flowchart of a method implemented in the wireless device in accordance with an embodiment of the present disclosure.

Referring to FIG. 3, there is a flowchart of a method 300 implemented in the wireless device $204_1$ which is located in a serving cell $203_1$ and configured to interact with a wireless access node $202_1$ in accordance with an embodiment of the present disclosure. Further, the wireless device $204_1$ includes a transceiver circuit $210_1$ configured with resources for a PUCCH and a sPUCCH, and a buffer 209 that has uplink data 207 stored therein. At step 302, the wireless device $204_1$ determines whether or not the sPUCCH performs equally well as the PUCCH (see FIGS. 4-8—the first embodiment through the fifth embodiment). At step 304, based on the determination of whether or not the sPUCCH performs equally well as the PUCCH, the wireless device $204_1$ applies a strategy for determining when to trigger a fallback, wherein the strategy is based on a number of failed SR transmissions 205 to the wireless access node $202_1$, wherein the SR transmissions 205 are transmitted by the transceiver circuit $210_1$ to the wireless access node $202_1$ due to the buffer 209 having uplink data 207 stored therein, and wherein the fallback if triggered includes releasing the resources for the PUCCH and the sPUCCH (see FIGS. 9-11—the sixth embodiment through the eighth embodiment).

Figure 4:
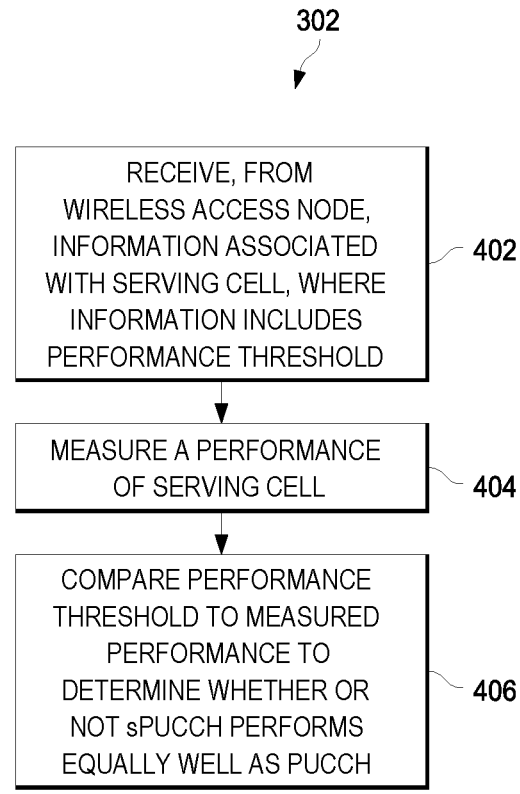
FIG. 4 is a flowchart illustrating more detailed steps associated with the determining step of the method shown in FIG. 3 in accordance with the first embodiment of the presented disclosure.

Referring to FIG. 4, there is a flowchart illustrating more detailed steps associated with the determining step 302 of method 300 in accordance with the first embodiment of the presented disclosure. In the first embodiment, the wireless device $204_1$ can determine whether or not the sPUCCH performs equally well as the PUCCH by: (1) receiving, from the wireless access node $202_1$, information 240 associated with the serving cell $203_1$, wherein the information 240 includes a parameter 241 that identifies a performance threshold 242 (step 402); (2) measuring a performance 244 of the serving cell $203_1$ (step 404); and (3) comparing the performance threshold 242 to the measured performance 244 and based on a determination that the measured performance 244 meets or exceeds the performance threshold 242 determine that the sPUCCH performs equally well as the PUCCH otherwise determine that the sPUCCH does not perform as equally well as the PUCCH (step 406). The received information 240 can be part of one of the following (for example): system information 240a, a higher layer configuration procedure 240b, Downlink Control Information (DCI) 240c, or a Medium Access Control (MAC) Control Element (CE) 240d. Plus, the performance threshold 242 can be one of following (for example): a downlink coverage level 242a of a downlink control channel where the downlink coverage level 242a can include a Block Error Rate (BLER) threshold 242b (where a measured BLER 244b at or below the provided BLER threshold 242b means the measured performance meets or exceeds the performance threshold), a Signal to Noise Ratio (SNR) threshold 242c (where a measured SNR 244c exceeding or equaling the provided SNR threshold 242c means the measured performance meets or exceeds the performance threshold), or a Signal to Interference and Noise Ratio (SINR) threshold 242d (where a measured SINR 244d exceeding or equaling the provided SINR threshold 242d means the measured performance meets or exceeds the performance threshold).

Figure 5:
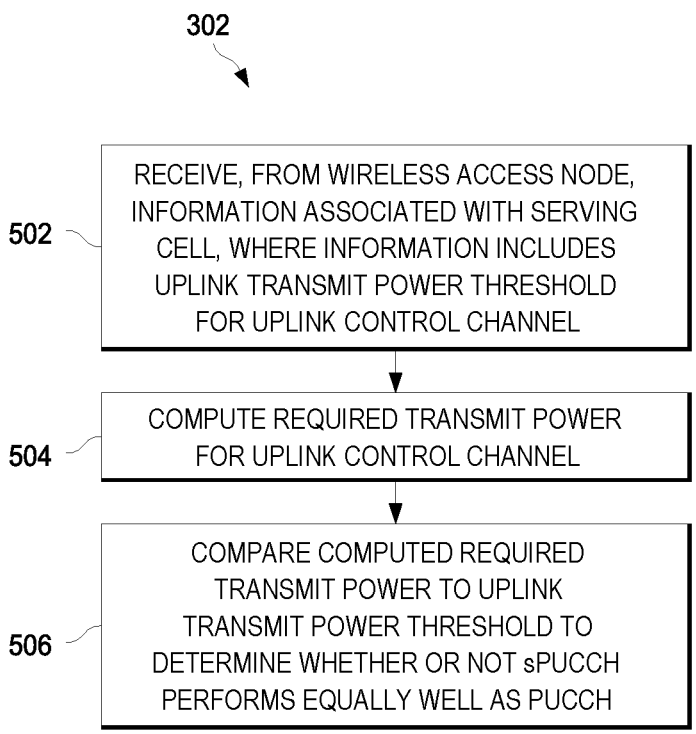
FIG. 5 is a flowchart illustrating more detailed steps associated with the determining step of the method shown in FIG. 3 in accordance with the second embodiment of the presented disclosure.

Referring to FIG. 5, there is a flowchart illustrating more detailed steps associated with the determining step 302 of method 300 in accordance with the second embodiment of the presented disclosure. In the second embodiment, the wireless device $204_1$ can determine whether or not the sPUCCH performs equally well as the PUCCH by: (1) receiving, from the wireless access node $202_1$, information 240 associated with the serving cell $203_1$, wherein the information 240 includes an uplink transmit power threshold 242f for an uplink control channel (step 502); (2) computing a required transmit power 244f for the uplink control channel according to a specified power control equation (e.g., see power control equation discussed above in Background Section) (step 504); and (3) comparing the computed required transmit power 244f to the received uplink transmit power threshold 242f and based on determination that the computed required transmit power 244f is below the received uplink transmit power threshold 242f determine that the sPUCCH performs equally well as the PUCCH otherwise determine that the sPUCCH does not perform as equally well as the PUCCH (step 506).

Figure 6:
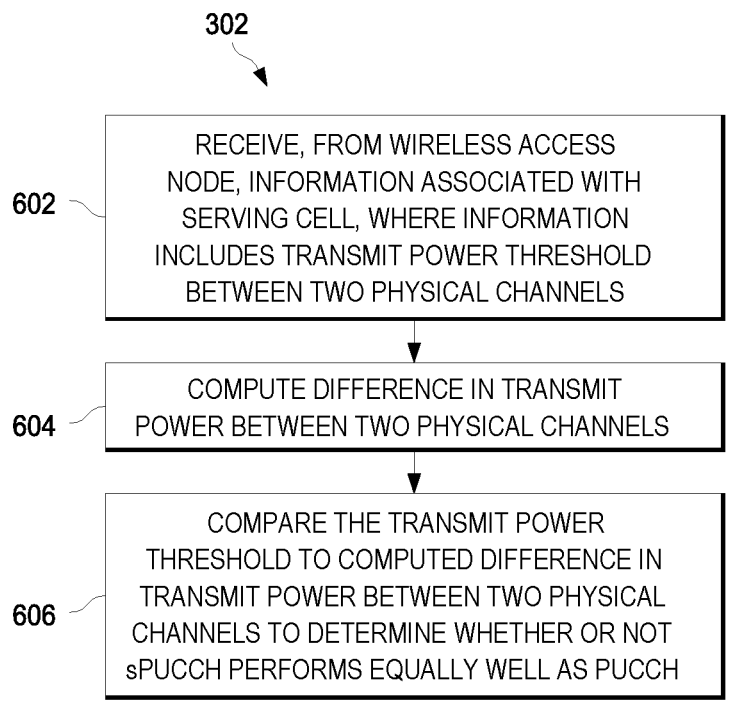
FIG. 6 is a flowchart illustrating more detailed steps associated with the determining step of the method shown in FIG. 3 in accordance with the third embodiment of the presented disclosure.

Referring to FIG. 6, there is a flowchart illustrating more detailed steps associated with the determining step 302 of method 300 in accordance with the third embodiment of the presented disclosure. In the third embodiment, the wireless device $204_1$ can determine whether or not the sPUCCH performs equally well as the PUCCH by: (1) receiving, from the wireless access node $202_1$, information 240 associated with the serving cell $203_1$, wherein the information 240 includes a threshold 242g related to a difference in transmit power between two physical channels (step 602); (2) computing a transmit power difference 244g between the two physical channels (step 604); and (3) comparing the computed transmit power difference 244g and the received threshold 242g and based on a determination that the computed transmit power difference 244g is less than the received threshold 242g determine that the sPUCCH performs equally well as the PUCCH otherwise determine that the sPUCCH does not perform as equally well as the PUCCH (step 606).

Figure 7:
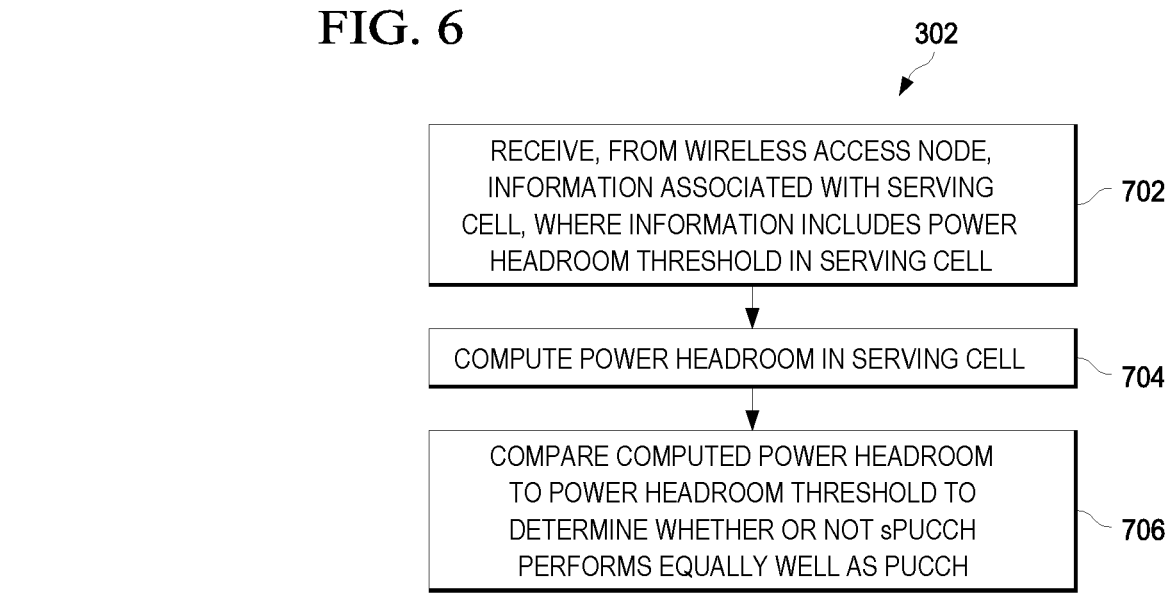
FIG. 7 is a flowchart illustrating more detailed steps associated with the determining step of the method shown in FIG. 3 in accordance with the fourth embodiment of the presented disclosure.

Referring to FIG. 7, there is a flowchart illustrating more detailed steps associated with the determining step 302 of method 300 in accordance with the fourth embodiment of the presented disclosure. In the fourth embodiment, the wireless device $204_1$ can determine whether or not the sPUCCH performs equally well as the PUCCH by: (1) receiving, from the wireless access node $202_1$, information 240 associated with the serving cell $203_1$, wherein the information 240 includes a power headroom 242h in the serving cell $203_1$ (step 702) (power headroom 242h represents a value below the maximum transmit power of which the wireless device $204_1$ is capable); (2) computing a power headroom $244h$ in the serving cell $203_1$ (step 704) (the power headroom $244h$ represents the actual difference between the maximum transmit power of which the wireless device $204_1$ is capable and the transmit power level the wireless device $204_1$ determines to be required for the PUSCH or SRS); and (3) comparing the computed power headroom $244h$ to the received power headroom $242h$ and based on a determination that the computed power headroom $244h$ meets or exceeds the value of the received power headroom $242h$ determine that the sPUCCH performs equally well as the PUCCH (e.g., the power headroom $242h$ can be set to a value 9 dB below the maximum transmit power of which the wireless device $204_1$ is capable which means as long as the computed power headroom $244h$ is 9 dB or more below the maximum transmit power then the sPUCCH can be viewed as performing as well as the PUCCH) otherwise determine that the sPUCCH does not perform as equally well as the PUCCH (step 706).

Figure 8:
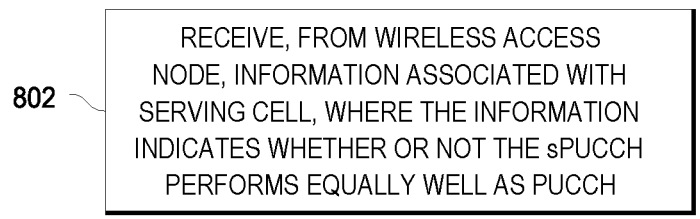
FIG. 8 is a flowchart illustrating more detailed steps associated with the determining step of the method shown in FIG. 3 in accordance with the fifth embodiment of the presented disclosure.

Referring to FIG. 8, there is a flowchart illustrating more detailed steps associated with the determining step 302 of method 300 in accordance with the fifth embodiment of the presented disclosure. In the fifth embodiment, the wireless device $204_1$ can determine whether or not the sPUCCH performs equally well as the PUCCH by receiving, from the wireless access node $202_1$, information 240e associated with the serving cell $203_1$, wherein the information 240e indicates whether or not the sPUCCH performs equally well as the PUCCH.

Figure 9:
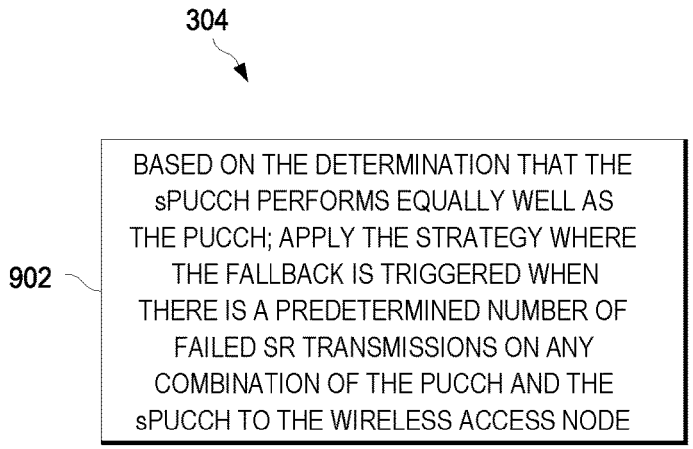
FIG. 9 is a flowchart illustrating more detailed steps associated with the applying step of the method shown in FIG. 3 in accordance with the sixth embodiment of the presented disclosure.

Referring to FIG. 9, there is a flowchart illustrating more detailed steps associated with the applying step 304 of method 300 in accordance with the sixth embodiment of the presented disclosure. In the sixth embodiment, based on the determination that the sPUCCH performs equally well as the PUCCH, the wireless device $204_1$ applies the strategy where the fallback is triggered when there is a predetermined number of failed SR transmissions 205 on any combination of the PUCCH and the sPUCCH to the wireless access node $202_1$ (step 902). The wireless device $204_1$ when the fallback is triggered releases its PUCCH and sPUCCH resources and resorts to contention-based access on the Physical Random Access Channel (PRACH) to indicate to the wireless access node $202_1$ that it has data 207 to send to the wireless access node $202_1$.

Figure 10:
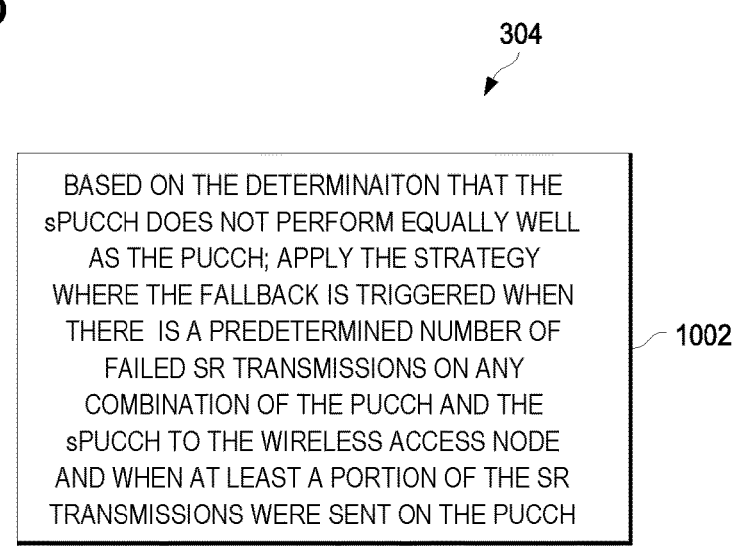
FIG. 10 is a flowchart illustrating more detailed steps associated with the applying step of the method shown in FIG. 3 in accordance with the seventh embodiment of the presented disclosure.

Referring to FIG. 10, there is a flowchart illustrating more detailed steps associated with the applying step 304 of method 300 in accordance with the seventh embodiment of the presented disclosure. In the seventh embodiment, based on the determination that the sPUCCH does not perform equally well as the PUCCH, the wireless device $204_1$ applies the strategy where the fallback is triggered when there is a predetermined number of failed SR transmissions 205 on any combination of the PUCCH and the sPUCCH to the wireless access node $202_1$ and when at least a portion of the SR transmissions 205 were transmitted on the PUCCH (step 1002). The wireless device $204_1$ when the fallback is triggered releases its PUCCH and sPUCCH resources and resorts to contention-based access on the Physical Random Access Channel (PRACH) to indicate to the wireless access node $202_1$ that it has data 207 to send to the wireless access node $202_1$.

Figure 11:
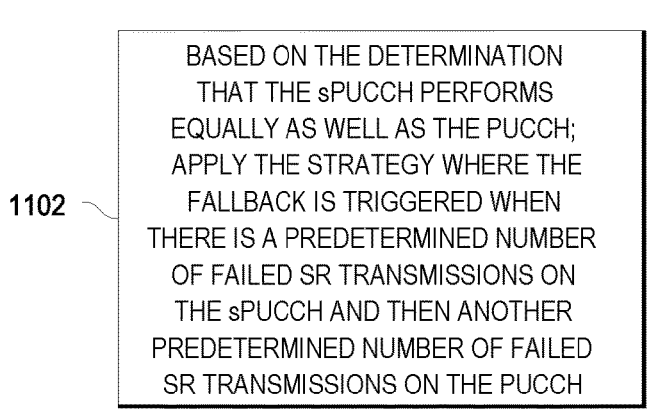
FIG. 11 is a flowchart illustrating more detailed steps associated with the applying step of the method shown in FIG. 3 in accordance with the eighth embodiment of the presented disclosure.

Referring to FIG. 11, there is a flowchart illustrating more detailed steps associated with the applying step 304 of method 300 in accordance with the eighth embodiment of the presented disclosure. In the eighth embodiment, based on the determination that the sPUCCH performs equally well as the PUCCH, the wireless device $204_1$ applies the strategy where the fallback is triggered when there is a predetermined number of failed SR transmissions 205 on the sPUCCH to the wireless access node $202_1$ and then another predetermined number of failed SR transmissions 205 on the PUCCH to the wireless access node $202_1$ (step 1102). The wireless device $204_1$ when the fallback is triggered releases its PUCCH and sPUCCH resources and resorts to contention-based access on the Physical Random Access Channel (PRACH) to indicate to the wireless access node $202_1$ that it has data 207 to send to the wireless access node $202_1$.

Figure 12:
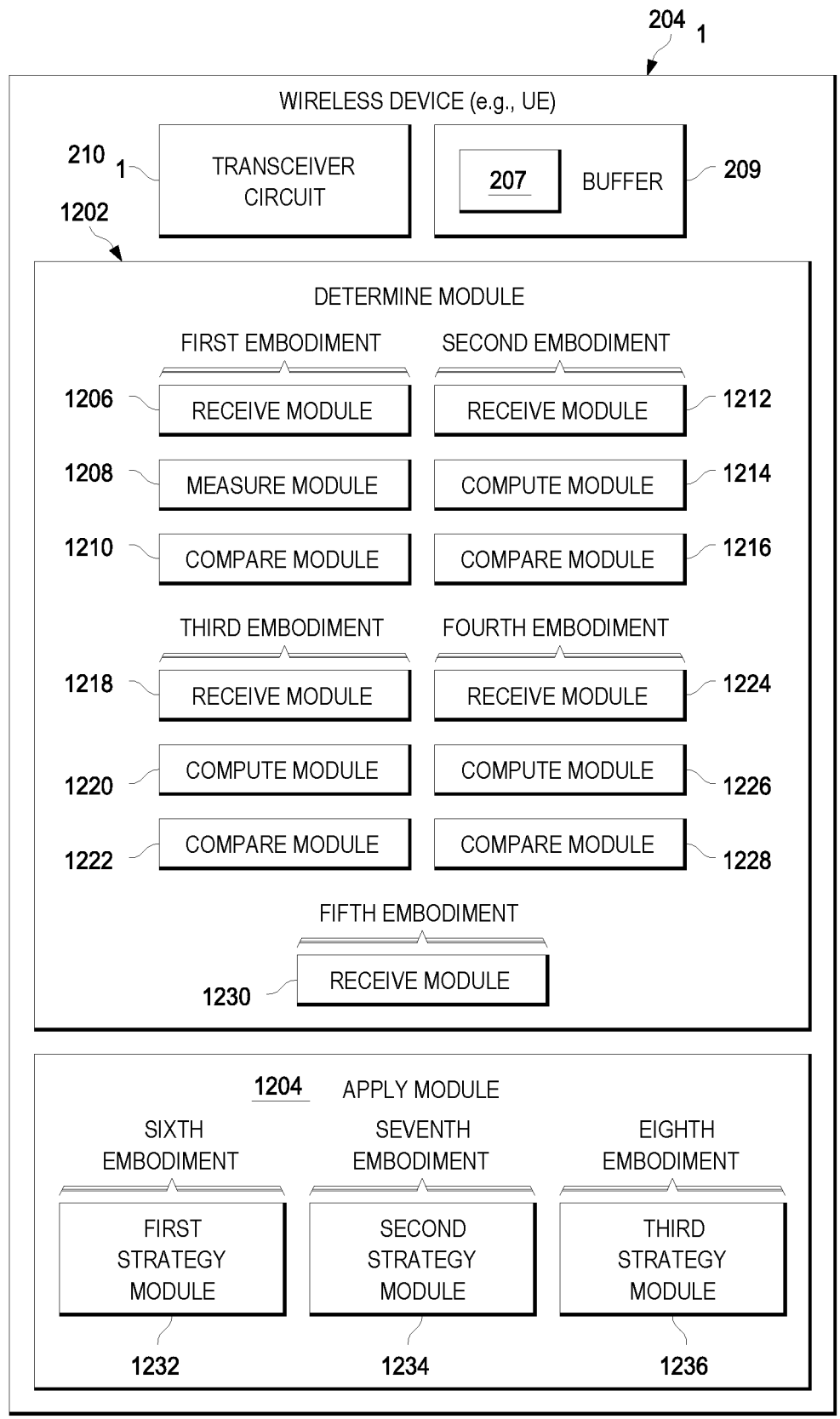
FIG. 12 is a block diagram illustrating a structure of the wireless device configured in accordance with an embodiment of the present disclosure.

Referring to FIG. 12, there is a block diagram illustrating structures of an exemplary wireless device $204_1$ (e.g., UE $204_1$) configured in accordance with an embodiment of the present disclosure. As discussed above, the wireless device $204_1$ is located in a serving cell $203_1$ and configured to interact with a wireless access node $202_1$. Further, the wireless device $204_1$ includes a transceiver circuit $210_1$ configured with resources for a PUCCH and a sPUCCH and a buffer 209 that has uplink data 207 stored therein. Moreover, the wireless device $204_1$ comprises a determine module 1202, and an apply module 1204. The determine module 1202 is configured to determine whether or not the sPUCCH performs equally well as the PUCCH (see discussion below regarding the first, second, third, fourth, and fifth embodiments). The apply module 1204, based on the determination of whether or not the sPUCCH performs equally well as the PUCCH, is configured to apply a strategy for determining when to trigger a fallback, wherein the strategy is based on a number of failed SR transmissions 205 to the wireless access node $202_1$, wherein the SR transmissions 205 are transmitted by the transceiver circuit $210_1$ to the wireless access node $202_1$ due to the buffer 209 having uplink data 207 stored therein, and wherein the fallback if triggered includes releasing the resources for the PUCCH and the sPUCCH (see discussion below regarding the sixth, seventh, and eighth embodiments). It should be appreciated that the wireless device $204_1$ may also include other components, modules or structures which are well-known, but for clarity, only the components, modules or structures needed to describe the features of the present disclosure are described herein.

In the first embodiment, the determine module 1202 is configured to include the following: (1) a receive module 1206 configured to receive, from the wireless access node $202_1$, information 240 associated with the serving cell $203_1$, wherein the information 240 includes a parameter 241 that identifies a performance threshold 242; (2) a measure module 1208 configured to measure a performance 244 of the serving cell $203_1$; and (3) a compare module 1210 configured to compare the performance threshold 242 to the measured performance 244 and based on a determination that the measured performance 244 meets or exceeds the performance threshold 242 determine that the sPUCCH performs equally well as the PUCCH otherwise determine that the sPUCCH does not perform as equally well as the PUCCH (see the discussion above for more details about the received information 240 and the performance threshold 242).

In the second embodiment, the determine module 1202 is configured to include the following: (1) a receive module 1212 configured to receive, from the wireless access node $202_1$, information 240 associated with the serving cell $203_1$, wherein the information 240 includes an uplink transmit power threshold 242f for an uplink control channel; (2) a compute module 1214 configured to compute a required transmit power 244f for the uplink control channel according to a specified power control equation; and (3) a compare module 1216 configured to compare the computed required transmit power 244f to the received uplink transmit power threshold 242f and based on determination that the computed required transmit power 244f is below the received uplink transmit power threshold 242f determine that the sPUCCH performs equally well as the PUCCH otherwise determine that the sPUCCH does not perform as equally well as the PUCCH.

In the third embodiment, the determine module 1202 is configured to include the following: (1) a receive module 1218 configured to receive, from the wireless access node $202_1$, information 240 associated with the serving cell $203_1$, wherein the information 240 includes a threshold 242g related to a difference in transmit power between two physical channels; (2) a compute module 1220 configured to compute a transmit power difference 244g between the two physical channels; and (3) a compare module 1222 configured to compare the computed transmit power difference 244g and the received threshold 242g and based on a determination that the computed transmit power difference 244g is less than the received threshold 242g determine that the sPUCCH performs equally well as the PUCCH otherwise determine that the sPUCCH does not perform as equally well as the PUCCH.

In the fourth embodiment, the determine module 1202 is configured to include the following: (1) a receive module 1224 configured to receive, from the wireless access node $202_1$, a power headroom 242h in the serving cell $203_1$; (2) a compute module 1226 configured to compute a power headroom 244h in the serving cell $203_1$; and (3) a compare module 1228 configured to compare the computed power headroom 244h to the received power headroom 242h and based on a determination that the computed power headroom 244h meets or exceeds the received power headroom 242h determine that the sPUCCH performs equally well as the PUCCH otherwise determine that the sPUCCH does not perform as equally well as the PUCCH.

In the fifth embodiment, the determine module 1202 is configured to include a receive module 1230 configured to receive, from the wireless access node $202_1$, information 240e associated with the serving cell $203_1$, wherein the information 240e indicates whether or not the sPUCCH performs equally well as the PUCCH.

In the sixth embodiment, the apply module 1204 is configured to include a first strategy module 1232 which based on the determination that the sPUCCH performs equally well as the PUCCH is configured to apply the strategy where the fallback is triggered when there is a predetermined number of failed SR transmissions 205 on any combination of the PUCCH and the sPUCCH to the wireless access node $202_1$.

In the seventh embodiment, the apply module 1204 is configured to include a second strategy module 1234 which based on the determination that the sPUCCH does not perform equally well as the PUCCH is configured to apply the strategy where the fallback is triggered when there is a predetermined number of failed SR transmissions 205 on any combination of the PUCCH and the sPUCCH to the wireless access node $202_1$ and when at least a portion of the SR transmissions 205 were transmitted on the PUCCH.

In the eighth embodiment, the apply module 1204 is configured to include a third strategy module 1236 which based on the determination that the sPUCCH performs equally well as the PUCCH is configured to apply the strategy where the fallback is triggered when there is a predetermined number of failed SR transmissions 205 on the sPUCCH to the wireless access node $202_1$ and then another predetermined number of failed SR transmissions 205 on the PUCCH to the wireless access node $202_1$.

As those skilled in the art will appreciate, the above-described modules 1202 (including sub-modules 1206, 1208, 1210, 1212, 1214, 1216, 1218, 1220, 1222, 1224, 1226, 1228, 1230), and 1204 (including sub-modules 1232, 1234, and 1236) of the wireless device $204_1$ may be implemented as suitable dedicated circuit. Further, the modules 1202 (including sub-modules 1206, 1208, 1210, 1212, 1214, 1216, 1218, 1220, 1222, 1224, 1226, 1228, 1230), and 1204 (including sub-modules 1232, 1234, and 1236) can also be implemented using any number of dedicated circuits through functional combination or separation. In some embodiments, the modules 1202 (including sub-modules 1206, 1208, 1210, 1212, 1214, 1216, 1218, 1220, 1222, 1224, 1226, 1228, 1230), and 1204 (including sub-modules 1232, 1234, and 1236) may be even combined in a single application specific integrated circuit (ASIC). As an alternative software-based implementation, the wireless device $204_1$ may comprise a memory $220_1$, a processor $218_1$ (including but not limited to a microprocessor, a microcontroller or a Digital Signal Processor (DSP), etc.) and a transceiver $210_1$. The memory $220_1$ stores machine-readable program code executable by the processor $218_1$ to cause the wireless device $204_1$ to perform the steps of the above-described method 300. It is to be noted that the other wireless devices $204_2, 204_3 \ldots 204_n$ may be configured the same as wireless device $204_1$.

Figure 13:
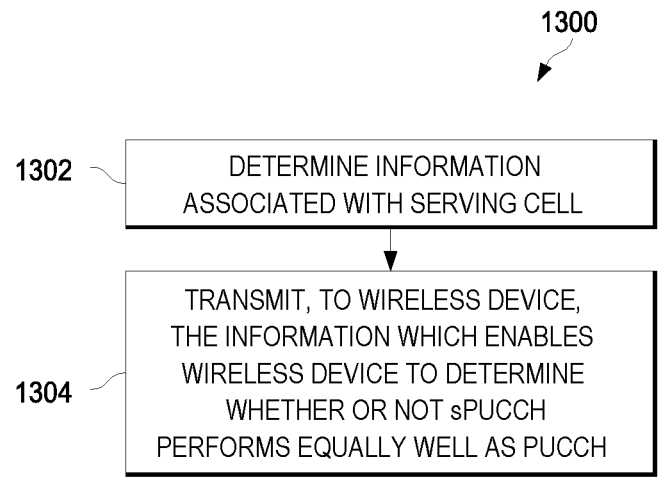
FIG. 13 is a flowchart of a method implemented in the wireless access node in accordance with an embodiment of the present disclosure; and, FIG. 14 is a block diagram illustrating a structure of the wireless access node configured in accordance with an embodiment of the present disclosure.

Referring to FIG. 13, there is a flowchart of a method 1300 implemented in the wireless access node $202_1$ configured to interact with a wireless device $204_1$ in accordance with an embodiment of the present disclosure. The wireless device $204_1$ is located in a serving cell $203_1$ and is configured with resources for a PUCCH and a sPUCCH, and includes a buffer 209 that has uplink data 207 stored therein. At step 1302, the wireless access node $202_1$ determines information 240, 240e associated with the serving cell $203_1$. At step 1304, the wireless access node $202_1$ transmits, to the wireless device $204_1$, the information 240, 240e associated with the serving cell $203_1$, wherein the information 240, 240e enables the wireless device $204_1$ to determine whether or not the sPUCCH performs equally well as the PUCCH. The wireless access node $202_1$ is operable to transmit the determined information 240 to the wireless device $204_1$ as part of one of the following (for example): system information 240a, a higher layer configuration procedure 240b, Downlink Control Information (DCI) 240c, or a Medium Access Control (MAC) Control Element (CE) 240d. The determined information 240 includes a parameter 241 that identifies a performance threshold 242, wherein the performance threshold 242 is one of following (for example): a downlink coverage level 242a of a downlink control channel where the downlink coverage level 242a can include a Block Error Rate (BLER) threshold 242b, a Signal to Noise Ratio (SNR) threshold 242c, a Signal to Interference and Noise Ratio (SINR) threshold 242d, an uplink transmit power threshold 244f for an uplink control channel, a threshold 244g related to a difference in transmit power between two physical channels, or a power headroom 244h in the serving cell $203_1$. Alternatively, the determined information 240e can explicitly indicate whether or not the sPUCCH performs equally well as the PUCCH.

Figure 14:
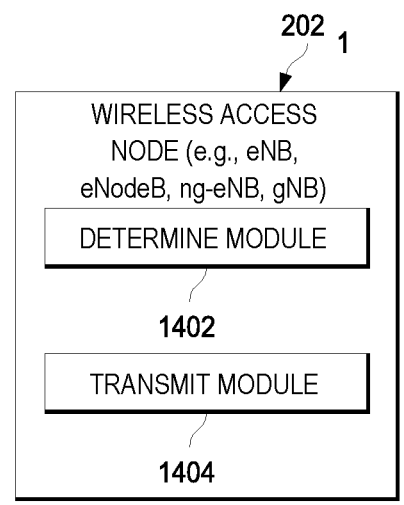

Referring to FIG. 14, there is a block diagram illustrating structures of an exemplary wireless access node $202_1$ (e.g., eNB $202_1$, eNodeB $202_1$, ng-eNB $202_1$, gNB $202_1$) configured in accordance with an embodiment of the present disclosure. As discussed above, the wireless access node $202_1$ is configured to interact with the wireless device $204_1$ which is located in a serving cell $203_1$ and is configured with resources for a PUCCH and a sPUCCH. The wireless access node $202_1$ comprises a determine module 1402 and a transmit module 1404. The determine module 1402 is configured to determine information 240, 240e associated with the serving cell $203_1$. The transmit module 1404 is configured to transmit, to the wireless device $204_1$, the information 240, 240e associated with the serving cell $203_1$, wherein the information 240, 240e enables the wireless device $204_1$ to determine whether or not the sPUCCH performs equally well as the PUCCH. The wireless access node $202_1$ is operable to transmit the determined information 240 to the wireless device $204_1$ as part of one of the following (for example): system information 240a, a higher layer configuration procedure 240b, Downlink Control Information (DCI) 240c, or a Medium Access Control (MAC) Control Element (CE) 240d. The determined information 240 includes a parameter 241 that identifies a performance threshold 242, wherein the performance threshold 242 is one of following (for example): a downlink coverage level 242a of a downlink control channel where the downlink coverage level 242a can include a Block Error Rate (BLER) threshold 242b, a Signal to Noise Ratio (SNR) threshold 242c, a Signal to Interference and Noise Ratio (SINR) threshold 242d, an uplink transmit power threshold 244f for an uplink control channel, a threshold 244g related to a difference in transmit power between two physical channels, or a power headroom 244h in the serving cell $203_1$. Alternatively, the determined information 240e can explicitly indicate whether or not the sPUCCH performs equally well as the PUCCH. In addition, it should be appreciated that the wireless access node $202_1$ may also include other components, modules or structures which are well-known, but for clarity, only the components, modules or structures needed to describe the features of the present disclosure are described herein.

As those skilled in the art will appreciate, the above-described modules 1402 and 1404 of the wireless access node $202_1$ may be implemented as suitable dedicated circuit. Further, the modules 1402 and 1404 can also be implemented using any number of dedicated circuits through functional combination or separation. In some embodiments, the modules 1402 and 1404 may be even combined in a single application specific integrated circuit (ASIC). As an alternative software-based implementation, the wireless access node $202_1$ may comprise a memory $234_1$, a processor $232_1$ (including but not limited to a microprocessor, a microcontroller or a Digital Signal Processor (DSP), etc.) and a transceiver $222_1$. The memory $234_1$ stores machine-readable program code executable by the processor $232_1$ to cause the wireless access node $202_1$ to perform the steps of the above-described method 1300. It is to be noted that the other wireless access node $202_2$ may be configured the same as the aforementioned wireless access node $202_1$.

In view of the foregoing, it should be appreciated that embodiments described herein are illustrated by exemplary embodiments. It should also be appreciated that these embodiments are not mutually exclusive. That is, the components from one embodiment may be tacitly assumed to be present in another embodiment and it will be obvious to a person skilled in the art how those components may be used in the other exemplary embodiments.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that has been set forth and defined within the following claims.

The invention claimed is:

1. A wireless device located in a serving cell and configured to interact with a wireless access node, the wireless device comprising:
   a transceiver circuit configured with resources for a Physical Uplink Control Channel (PUCCH) and a short PUCCH (sPUCCH);
   a buffer that has uplink data stored therein;
   a processor; and
   a memory that stores processor-executable instructions, the processor interfacing with the memory to execute the processor-executable instructions, to cause the wireless device to:
      determine whether or not the sPUCCH performs equally well as the PUCCH; and,
      based on the determination of whether or not the sPUCCH performs equally well as the PUCCH, apply a strategy for determining when to trigger a fallback, the strategy being based on a number of failed Scheduling Request (SR) transmissions to the wireless access node, the SR transmissions being transmitted by the transceiver circuit to the wireless access node due to the buffer having uplink data stored therein, and the fallback when triggered includes releasing the resources for the PUCCH and the sPUCCH.

2. The wireless device of claim 1, wherein the wireless device performs the determine operation as follows:
receive, from the wireless access node, information associated with the serving cell, wherein the information includes a parameter that identifies a performance threshold;
measure a performance of the serving cell; and
compare the performance threshold to the measured performance and based on a determination that the measured performance meets or exceeds the performance threshold determine that the sPUCCH performs equally well as the PUCCH,
wherein the received information is part of one of the following: system information, a higher layer configuration procedure, Downlink Control Information (DCI), or a Medium Access Control (MAC) Control Element (CE); and
wherein the performance threshold is a downlink coverage level of a downlink control channel, where the downlink coverage level includes one of the following: a Block Error Rate (BLER) threshold, a Signal to Noise Ratio (SNR) threshold, or a Signal to Interference and Noise Ratio (SINR) threshold.

3. The wireless device of claim 1, wherein the wireless device performs the determine operation as follows:
receive, from the wireless access node, information associated with the serving cell, wherein the information includes an uplink transmit power threshold for an uplink control channel;
compute a required transmit power for the uplink control channel according to a specified power control equation; and
compare the computed required transmit power to the received uplink transmit power threshold and based on determination that the computed required transmit power is below the received uplink transmit power threshold determine that the sPUCCH performs equally well as the PUCCH.

4. The wireless device of claim 1, wherein the wireless device performs the determine operation as follows:
receive, from the wireless access node, information associated with the serving cell, wherein the information includes a threshold related to a difference in transmit power between two physical channels;
compute a transmit power difference between the two physical channels; and
compare the computed transmit power difference and the received threshold and based on a determination that the computed transmit power difference is less than the received threshold determine that the sPUCCH performs equally well as the PUCCH.

5. The wireless device of claim 1, wherein the wireless device performs the determine operation as follows:
receive, from the wireless access node, a power headroom in the serving cell;
compute a power headroom in the serving cell; and,
compare the computed power headroom to the received power headroom and based on a determination that the computed power headroom meets or exceeds the received power headroom determine that the sPUCCH performs equally well as the PUCCH.

6. The wireless device of claim 1, wherein the wireless device performs the determine operation as follows:
receive, from the wireless access node, information associated with the serving cell, wherein the information indicates whether or not the sPUCCH performs equally well as the PUCCH.

7. The wireless device of claim 1, wherein the wireless device performs the apply operation as at least one of the following:
based on the determination that the sPUCCH performs equally well as the PUCCH, apply the strategy where the fallback is triggered when there is a predetermined number of failed SR transmissions on any combination of the PUCCH and the sPUCCH to the wireless access node;
based on the determination that the sPUCCH does not perform equally well as the PUCCH, apply the strategy where the fallback is triggered when there is a predetermined number of failed SR transmissions on any combination of the PUCCH and the sPUCCH to the wireless access node and when at least a portion of the SR transmissions were transmitted on the PUCCH; and
based on the determination that the sPUCCH performs equally well as the PUCCH, apply the strategy where the fallback is triggered when there is a predetermined number of failed SR transmissions on the sPUCCH and then another predetermined number of failed SR transmissions on the PUCCH.

8. A method implemented by a wireless device located in a serving cell and configured to interact with a wireless access node, the wireless device further comprises a transceiver circuit configured with resources for a Physical Uplink Control Channel (PUCCH) and a short PUCCH (sPUCCH) and a buffer that has uplink data stored therein, the method comprising:
determining whether or not the sPUCCH performs equally well as the PUCCH; and,
based on the determination of whether or not the sPUCCH performs equally well as the PUCCH, applying a strategy for determining when to trigger a fallback, the strategy being based on a number of failed Scheduling Request (SR) transmissions to the wireless access node, the SR transmissions being transmitted by the transceiver circuit to the wireless access node due to the buffer having uplink data stored therein, and the fallback when triggered includes releasing the resources for the PUCCH and the sPUCCH.

9. The method of claim 8, wherein the determining step further comprises:
receiving, from the wireless access node, information associated with the serving cell, wherein the information includes a parameter that identifies a performance threshold;
measuring a performance of the serving cell; and
comparing the performance threshold to the measured performance and based on a determination that the measured performance meets or exceeds the performance threshold determine that the sPUCCH performs equally well as the PUCCH,
wherein the received information is part of one of the following: system information, a higher layer configuration procedure, Downlink Control Information (DCI), or a Medium Access Control (MAC) Control Element (CE); and
wherein the performance threshold is a downlink coverage level of a downlink control channel where the downlink coverage level includes one of the following: a Block Error Rate (BLER) threshold, a Signal to Noise Ratio (SNR) threshold, or a Signal to Interference and Noise Ratio (SINR) threshold.

10. The method of claim 8, wherein the determining step further comprises:
- receiving, from the wireless access node, information associated with the serving cell, wherein the information includes an uplink transmit power threshold for an uplink control channel;
- computing a required transmit power for the uplink control channel according to a specified power control equation; and
- comparing the computed required transmit power to the received uplink transmit power threshold and based on determination that the computed required transmit power is below the received uplink transmit power threshold determine that the sPUCCH performs equally well as the PUCCH.

11. The method of claim 8, wherein the determining step further comprises:
- receiving, from the wireless access node, information associated with the serving cell, wherein the information includes a threshold related to a difference in transmit power between two physical channels;
- computing a transmit power difference between the two physical channels; and
- comparing the computed transmit power difference and the received threshold and based on a determination that the computed transmit power difference is less than the received threshold determine that the sPUCCH performs equally well as the PUCCH.

12. The method of claim 8, wherein the determining step further comprises:
- receiving, from the wireless access node, a power headroom in the serving cell;
- computing a power headroom in the serving cell; and,
- comparing the computed power headroom to the received power headroom and based on a determination that the computed power headroom meets or exceeds the received power headroom determine that the sPUCCH performs equally well as the PUCCH.

13. The method of claim 8, wherein the determining step further comprises:
- receiving, from the wireless access node, information associated with the serving cell, wherein the information indicates whether or not the sPUCCH performs equally well as the PUCCH.

14. The method of claim 8, wherein the applying step further comprises at least one of the following:
- based on the determination that the sPUCCH performs equally well as the PUCCH, applying the strategy where the fallback is triggered when there is a predetermined number of failed SR transmissions on any combination of the PUCCH and the sPUCCH to the wireless access node;
- based on the determination that the sPUCCH does not perform equally well as the PUCCH, applying the strategy where the fallback is triggered when there is a predetermined number of failed SR transmissions on any combination of the PUCCH and the sPUCCH to the wireless access node and when at least a portion of the SR transmissions were transmitted on the PUCCH; and
- based on the determination that the sPUCCH performs equally well as the PUCCH, applying the strategy where the fallback is triggered when there is a minimum predetermined number of failed SR transmissions on the sPUCCH and then another minimum predetermined number of failed SR transmissions on the PUCCH.

15. A wireless access node configured to interact with a wireless device, the wireless device being located in a serving cell, and the wireless device being configured with resources for a Physical Uplink Control Channel (PUCCH) and a short PUCCH (sPUCCH), the wireless access node comprising:
- a processor; and
- a memory that stores processor-executable instructions, the processor interfacing with the memory to execute the processor-executable instructions, to configure the wireless access node to:
  - determine information associated with the serving cell;
  - transmit, to the wireless device, the information associated with the serving cell, wherein the information enables the wireless device to determine whether or not the sPUCCH performs equally well as the PUCCH;
  - the determined information includes a parameter, the parameter identifies a performance threshold, the performance threshold is a downlink coverage level of a downlink control channel, the downlink coverage level includes one of the following:
    - a Block Error Rate (BLER) threshold, a Signal to Noise Ratio (SNR) threshold, or a Signal to Interference and Noise Ratio (SINR) threshold; and
  - the parameter refers to:
    - an uplink transmit power threshold for an uplink control channel;
    - a threshold related to a difference in transmit power between two physical channels; or
    - a power headroom in the serving cell.

16. The wireless access node of claim 15, wherein the wireless access node is operable to transmit the determined information to the wireless device as part of one of the following: system information, a higher layer configuration procedure, Downlink Control Information (DCI), or a Medium Access Control (MAC) Control Element (CE).

17. The wireless access node of claim 15, wherein the determined information indicates whether or not the sPUCCH performs equally well as the PUCCH.

18. A method implemented by a wireless access node configured to interact with a wireless device, the wireless device being located in a serving cell, and the wireless device being configured with resources for a Physical Uplink Control Channel (PUCCH) and a short PUCCH (sPUCCH), the method comprising:
- determining information associated with the serving cell;
- transmitting, to the wireless device, the information associated with the serving cell, wherein the information enables the wireless device to determine whether or not the sPUCCH performs equally well as the PUCCH;
- the determined information includes a parameter, the parameter identifies a performance threshold, the performance threshold is a downlink coverage level of a downlink control channel, the downlink coverage level includes one of the following:
  - a Block Error Rate (BLER) threshold, a Signal to Noise Ratio (SNR) threshold, or a Signal to Interference and Noise Ratio (SINR) threshold; and
- the parameter refers to:
  - an uplink transmit power threshold for an uplink control channel;
  - a threshold related to a difference in transmit power between two physical channels; or
  - a power headroom in the serving cell.

19. The method of claim 18, wherein the determined information is transmitted to the wireless device as part of one of the following: system information, a higher layer configuration procedure, Downlink Control Information (DCI), or a Medium Access Control (MAC) Control Element (CE).

20. The method of claim 18, wherein the determined information indicates whether or not the sPUCCH performs equally well as the PUCCH.

\* \* \* \* \*